Patented Dec. 19, 1939

2,184,235

UNITED STATES PATENT OFFICE 2,184,235

CATALYTIC DEHYDROGENATION OF ORGANIC COMPOUNDS

Herbert P. A. Groll, Berkeley, and James Burgin, Oakland, Calif., assignors to Shell Development Company, San Francisco, Calif., a corporation of Delaware No Drawing. Application December 6, 1937, Serial No. 178,358

9 Claims. (Cl. 260—683)

This invention relates to the catalytic treatment of organic compounds, and it provides a novel method in accordance with which a dehydrogenatable organic compound is subjected to the action of a particularly effective and novel dehydrogenation catalyst and catalytically dehydrogenated to an unsaturated organic compound containing fewer hydrogen atoms but the same number of carbon atoms.

In accordance with the process of the invention, which is a true catalytic dehydrogenation process and as such is to be distinguished from cracking processes, a dehydrogenatable organic compound is brought into contact with a solid catalyst essentially comprising an activated alumina and a catalytically active metal or metal compound, with the latter or a mixture thereof incorporated in the surface of said activated alumina to form a compound catalyst which is characterized by possession of the desired dehydrogenation inducing characteristics of the catalytically active metal or metal compound coupled with the physical structure and "ultra-porosity" of the activated alumina. The dehydrogenatable organic compound is contacted with the compound catalyst under such conditions of temperature, pressure and contact time that the materially predominating reaction is catalytic dehydrogenation, that is, the rupture of carbon-to-hydrogen bonds to split out hydrogen and result in a product containing fewer hydrogen atoms but the same number of carbon atoms to the molecule. Under the preferred conditions of operation, cracking reactions, which involve rupture of carbon-to-carbon bonds to form compounds which usually contain fewer carbon atoms than the material treated, do not occur to any substantial extent and are to be avoided since they lead to material losses.

While providing a practicable process broadly applicable to dehydrogenatable organic compounds, that is, compounds capable of being catalytically dehydrogenated to products containing the same number of carbon atoms but fewer hydrogen atoms, the invention is of particular usefulness and value in that it provides a practical and economical process for the technical scale conversion of paraffin hydrocarbons containing at least two carbon atoms, such as are contained in or derived from petroleum and petroleum products, to the corresponding commercially valuable olefines. The olefines are valuable raw materials in many important chemical industries. For example, they are treated in various known manners and converted to monohydric and polyhydric alcohols, ethers, halohydrins, esters, oxides, acids, resins, etc. The olefines are valuable base materials in the production of high anti-knock synthetic motor fuels and motor fuel mixtures.

A commercially attractive process for the conversion of a paraffin hydrocarbon to the corresponding olefine requires the use of a dehydrogenation catalyst. At high temperatures, in the absence of catalytically active materials, a paraffin hydrocarbon will undergo some pyrolysis to yield small amounts of the corresponding olefine. The main reaction, due to the high temperatures necessitated by the pyrolysis, is cracking, dehydrogenation occurring to only a very limited and impracticable extent. If temperatures sufficiently low to avoid cracking are employed, the dehydrogenation reaction is also retarded and at temperatures at which there is no cracking there is also no dehydrogenation.

Numerous catalysts have been proposed for accelerating the dehydrogenation reaction in attempts to bring the catalytic dehydrogenation of paraffin hydrocarbons within the field of practical utility. The proposed catalysts, mainly metals and metal oxides, have been used per se and supported on various inert supports and carriers. The great majority of the proposed catalysts and catalyst compositions are inherently unsatisfactory in one or more respects. No one of them combines in itself all of the characteristics which we have found to be essential requisites of a good dehydrogenation catalyst. Many of the known dehydrogenation catalysts are unsuitable because they are too active. Even when mounted on the conventional inactive carriers and supports, the catalysts of this class are so active that their use requires the employment of prohibitively low temperatures if cracking is to be avoided. Nickel metal and active metallic iron are representative members of the group of catalysts which per se are too active. Their efficient use requires such low temperatures that equilibrium conditions are reached when only a small amount of the treated material has been dehydrogenated. Some catalysts and catalyst compositions which are suitable from the standpoint of activity have been proposed. The great majority of these less active catalysts are unsuitable because of inherent physical characteristics or because of difficulties in preparing them in a sufficiently active and stable form. For example, some compounds have the requisite catalytic activity but cannot be prepared in a physical form in which they have the desired surface characteristics and stability under the optimum conditions of their use. The catalytically active gels, such as chromium oxide gel, are representative catalysts of the type which are unsuitable because of their instability and rapid loss of activity at the temperatures at which their use is practicable. Chromium oxide in the form of a gel is a selective dehydrogenation catalyst at a temperature of 400° C. However, at this temperature, the conversions are prohibitively low. Attempts to obtain a more favorable equilibrium by operating at higher temperatures result in rapid loss of activity due to breakdown of the physical structure of the catalyst material.

Investigation of numerous metallic elements and metal compounds has led us to the conclusion that the usefulness of a material as a dehydrogenation catalyst is dependent upon its chemical constitution, its physical structure and its surface characteristics. A material which has the requisite surface characteristics to which we refer in this specification is sometimes spoken of as possessing "ultra-porosity". These desirable surface characteristics manifest themselves by imparting to the material possessing them an adsorption capacity for gases and vapors. Thus, for each catalyst of the same chemical composition, there is a definite parallelism between its activity as a dehydrogenation catalyst and its adsorption capacity for gases and vapors, and a material which has no adsorption capacity is in general devoid of catalytic activity. A material to be a good dehydrogenation catalyst which has a high degree of activity over prolonged periods of time at the optimum temperatures for its use must possess, besides a dehydrogenation inducing chemical constitution, a stable physical structure and "ultra-porosity" which it retains at the high temperatures at which it functions efficiently as a dehydrogenation catalyst. We found that many metal compounds, which from theoretical considerations should be good dehydrogenation catalysts, were incapable of use because they could not be obtained in a form in which they had the physical structure and surface characteristics requisite to a good dehydrogenation catalyst. Slight modifications in the preparation of particular catalytic materials, by influencing the physical structure and surface characteristics of the product, materially affected their activity and usefulness as dehydrogenation catalysts. These considerations directed our efforts to the discovery of a material having the requisite physical structure and surface characteristics with which materials having the requisite dehydrogenation inducing activity could be combined in such amounts as to impart to the resulting compound catalyst the desired features of both constituents, and thus obtain a material which combines in itself the chemical constitution, physical structure and surface characteristics of the ideal dehydrogenation catalyst. Such compound dehydrogenation catalysts have been discovered and their preparation and use is hereinafter described in detail.

The compound catalysts employed in the execution of the process of the invention essentially comprise an activated alumina and a catalytically active metal or metal compound, with the former gravimetrically predominating, and with the metal or metal compound incorporated in the surface of the activated alumina to form a compound catalyst possessing the desired dehydrogenation inducing qualities of the active metal or active metal compound intimately coupled with the physical structure and "ultra-porosity" of the activated alumina. In some cases, the metal or metal compound which is incorporated in the surface of the activated alumina is in whole or in part in chemical combination with the activated alumina or the surface thereof. In other cases, the catalytic material may be merely physically adherent to the surface of the activated alumina or deposited in some of the pores thereof. In still other cases, one or more catalytic materials may be in chemical combination with the surface of the activated alumina while one or more of such materials is adherent to the surface of the activated alumina or deposited in some of the pores thereof. The expression "incorporated in the surface of the activated alumina" as used herein and in the appended claims is intended to cover all of the above as well as other cases.

An activated alumina is an essential constituent of the compound catalysts used in the execution of the process of the invention. Ordinary (unactivated) alumina cannot be used in lieu of an activated alumina in the compound catalyst because it does not possess the dehydrogenation activity or the physical structure and surface characteristics of an activated alumina. For the same reason, the customarily used catalyst supports and carriers such as pumice, porcelain chips, clay, brick screenings and the like refractory materials cannot be used in the preparation of catalysts having the characteristics of those used in the process of the invention; they do not possess the catalytic activity, physical structure and surface characteristic possessed by an activated alumina. Charcoal and silica gel are not equivalents of the activated alumina which is an essential constituent of the catalysts used in the process of this invention. Silica gel was tried and found unsuitable because of lack of activity and instability at high temperatures. Catalysts comprising charcoal do not have the requisite activity, and they are incapable of reactivation. The catalysts used in the execution of the process of the invention are not merely active metals and/or metal compounds supported on an inert carrier; they are true compound catalysts.

An activated alumina is in itself, under specific conditions, a dehydrogenation catalyst, and its use in the catalytic dehydrogenation of hydrocarbons is claimed in our copending application, Serial No. 31,450, filed July 15, 1935. While an activated alumina has the physical structure and surface characteristics desired in a dehydrogenation catalyst, it has other characteristics dependent upon its chemical constitution which render it less suitable in some cases than the compound catalysts used in the process of the present invention. Some of the specific characteristics of an activated alumina per se as a dehydrogenation catalyst are: It appears to have its maximum activity at temperatures of about 600° C. As the temperature is progressively increased above 600° C., selective dehydrogenation activity decreases and when temperatures of about 800° C. are reached the material begins to break down with almost complete loss of activity. At temperatures below about 600° C., the catalytic activity of an activated alumina decreases rapidly; it is in some cases almost entirely inactive at temperatures below 550° C. An activated alumina when used per se as a dehydrogenation catalyst shows a rather long induction period (about 6 hours). An activated alumina catalyst is quite sensitive to the presence of water vapor in the treated material. Concentrations of water vapor up to about 0.01% by volume in the feed appear to be essential to practicable activity of an activated alumina catalyst, but additional water has a deleterious effect and decreases its activity.

When metals and metal compounds having catalytic dehydrogenation activity are combined with an activated alumina by incorporation on the surface thereof, the desired physical structure and surface characteristics of the activated alumina and the desired catalytic activity of the desired metal or metal compound are possessed by the resulting compound catalyst. Because of the suitable physical structure and surface characteristics of the activated alumina, the added metal or metal compound imparts in large measure its inherent catalytic activity while the catalytic activity of the activated alumina, which is due to its chemical constitution, is to a certain extent obscured. The degree of this change depends upon the specific dehydrogenation activity of the added metal or metal compounds and its relative amount in the resulting compound catalyst. In the compound catalyst, the undesirable characteristics of an activated alumina per se as a catalyst are not in evidence. For example, a compound catalyst of the class to which this invention relates which consists of an activated alumina on the surface of which a metal compound such as a chromium oxide or chromium salt has been imposed is quite active at temperatures as low as 400° C.; it functions with only a slight induction period; it is much less sensitive to the presence of water vapor; and it retains its activity and stability at temperatures of 800° C. and higher.

In many cases, the activated alumina has a stabilizing effect on the catalytically active metal compound which is combined with it to result in the compound catalyst. For example, chromium oxide in the form of a gel has been found to be a good dehydrogenation catalyst. However, it cannot be used at temperatures greater than about 400° C. because of breakdown of its structure with consequent loss of activity. At temperatures of 400° C. and below, at which temperatures the gel is sufficiently stable, the conversions are prohibitively low. A compound catalyst consisting of an activated alumina and a chromium oxide, with the latter in lesser gravimetric amount and imposed on the surface of the former, is a very active catalyst which can be advantageously employed at temperatures as high as 800° C. with no breakdown of structure or loss of activity.

Many metals and metal compounds are such active dehydrogenation inducing materials that they cannot be used at even moderately low temperatures without excessive cracking. Incorporating these excessively active materials in the surface of an activated alumina to result in the compound catalysts herein described modifies their activity and results in a very suitable compound catalyst with a very high degree of dehydrogenation inducing activity over a wide range of temperatures. Reduced nickel oxide supported on pumice is active at temperatures as low as 300° C., but even at this low temperature excessive cracking occurs. At temperatures of 450° C., the treated hydrocarbon is completely cracked to carbon and hydrogen. Compound catalysts comprising nickel metal and an activated alumina can, after they have been pretreated with hydrogen sulphide, be employed at temperatures as high as from 500° C. to 600° C. with excellent conversions and with substantially no cracking.

Another example is furnished by iron oxides. Ferric oxide ($Fe_2O_3$), in the form of a gel, behaves similarly to nickel metal in that it induces excessive cracking even at relatively low temperatures. The iron oxides when imposed on the surface of an activated alumina as herein described result in a compound catalyst which is very selective and can be used with excellent results at relatively high temperatures with substantially no cracking.

The term "activated alumina" is used herein and in the appended claims to designate an aluminum oxide which is characterized by possessing the physical structure and surface characteristics of the "activated alumina" of commerce. "Activated alumina" is a well-known and readily available article of commerce. It has been prepared and sold in this country since 1930, being recommended and used for the adsorption of gases and vapors from gaseous mixtures. "Activated alumina" has been so named because of its active adsorption properties for gases and vapors, and not because of any catalyst activity.

As is known to the art, an activated alumina having the physical structure and active adsorption properties (surface characteristics) of the "activated alumina" of commerce can be prepared in a variety of suitable manners. U. S. Patents 1,868,869 and 2,015,593 each describe a different method for the production of such an activated alumina. A particularly suitable activated alumina is obtained in accordance with the process of U. S. Patent 1,868,869 which comprises subjecting to calcination, at a temperature of from 300° C. to 800° C., the deposit or scale which forms in the precipitation tanks and discharge pipes used in the execution of the Fickes-Sherwin modification of the Bayer process. Activated alumina may also be prepared by precipitating aluminum hydroxide from an aqueous sodium aluminate solution by passing slowly thereinto a stream of gaseous $CO_2$, and drying the resulting product by heating in air at about 600° C. Activated alumina can be prepared in still another manner which consists in treating aluminum amalgam under water and calcining the resulting fibrous aluminum hydroxide as described in K. A. Hofman's, "Lehrbuch der Anorganischen Chemie", 6th edition, p.483.

The fundamental difference between an activated alumina and an ordinary alumina is that the former possesses active vapor adsorption characteristics which the latter does not. Ordinary aluminum oxide, such as alumina prepared from aluminum hydroxide by the ordinary methods, has no adsorptive properties and no activity as a dehydrogenation catalyst. At a temperature of 600° C. at which an activated alumina per se is an active dehydrogenation catalyst, ordinary aluminum oxide was found to be totally inactive. At higher temperatures the use of ordinary alumina results in extensive cracking, the reaction and the low ratio of the desired olefine to the total olefines in the product being the same as are obtainable by the use of materials of no catalytic value such as pumice, quartz chips, porcelain, etc. There is a clear and definite parallelism between the adsorptive capacity and dehydrogenation activity of an alumina. An activated alumina which has catalytic dehydrogenation activity and can be used in the production of the compound catalyst employed in the execution of the process of the present invention is highly adsorptive for gases and vapors, while ordinary alumina which does not possess catalytic activity and is unsuitable as a constituent of the compound catalysts used in the execution of the invention does not have such adsorptive properties, or at most has them to only a very small degree.

The material which is incorporated in the surface of an activated alumina to result in the catalysts used in the execution of the process of the invention may be a metal, a mixture of metals, a metal compound, a mixture of metal compounds or one or more metals and one or more metal compounds. As has been stated, said material may or may not be in chemical combination with the activated alumina on the surface thereof. Suitable catalysts are those which, by virtue of their mode of preparation, comprise a metal or a metal compound such as a metal oxide, halide, sulphide, selenide, telluride, phosphate, manganate, molybdate, chromate, bichromate and the like incorporated in the surface of the activated alumina. For example, we have found that suitable catalysts are those which comprise a metal or a compound of a metal of the group consisting of chromium, nickel, iron, cobalt, manganese, vanadium, titanium, scandium, copper, zinc, ytterbium, zirconium, columbium, molybdenum, masurium, rubidium, platinum, rhodium, silver, cadmium, the rare earths, hafnium, tantalum, tungsten, osmium, irridium, gold, mercury, actinium, thorium, protoactinium and uranium, incorporated on the surface of the activated alumina. Some of these catalysts may be prepared by direct impregnation of the activated alumina with a solution of the metal compound which it is desired to incorporate in the surface thereof, while others can only be prepared indirectly, for example, by impregnation with one compound followed by a conversion treatment whereby said compound is converted to the desired compound. In any case, anyone skilled in the art can readily prepare a catalyst of any desired initial composition.

It will be noted that the above-listed metals are members of the transition series of the periodic table according to Bohr, and that the great majority of them are known to have variable valence. A preferred group of catalysts are those comprising an activated alumina and a metal and/or compound of a metal of the first transition series of the periodic table incorporated in the surface of the activated alumina. The first transition series embraces the metals scandium, titanium, vanadium, chomium, manganese, iron, cobalt, nickel, copper and zinc. The metals molybdenum, cerium, tungsten and uranium are representative elements of the second, third, fourth and fifth transition series; these metals and their compounds have been found to be very suitable constituents of the catalysts employed in the execution of the process of the invention. Good results have been obtained by employing catalysts initially comprising an activated alumina and at least one oxide, sulphide, selenide, telluride, halide, phosphate, manganate, molybdate, chromate or bichromate incorporated in the surface of the activated alumina. In general, excellent results can be obtained by employing catalysts consisting of an activated alumina and one or more oxides and/or sulphides of the above-listed metals incorporated in the surface of the activated alumina.

A preferred subgroup of compound catalysts embraces those comprising an activated alumina and one or more chromium compounds. The chromium may be present in the compound catalyst in any chemical combination, either in a positive or negative state. For example, the chromium may be present in any one or a plurality of the compounds such as $Cr(OH)_3$, $CrO_3$, $Cr_2O_3$, $Cr_2S_3$, $Cr_3S_4$, $CrS$, $CrCl_3$, $Cr_2(SO_4)_3$, $Cr(NO_3)_3$, $Na_2CrO_4$, $K_2CrO_4$, $K_2Cr_2O_7$, $Na_2Cr_2O_7$, $FeOCr_2O_3$, $Al_2(CrO_4)_3$ and the like.

Another preferred subgroup of compound catalysts embraces those comprising an activated alumina and one or more iron oxides and/or sulphides. Excellent compound catalysts are those comprising an activated alumina and one or more iron oxides and/or iron sulphides and one or more chromium compounds. Representative compound catalysts of this mixed type are the compound catalysts of the composition $Fe_2O_3$—$Cr_2O_3$—activated alumina, $Fe_3O_4$—$Na_2Cr_2O_7$—activated alumina, and the like.

The compound catalysts may be prepared in a variety of suitable manners. A convenient method comprises impregnating the activated alumina, in the form of granules or pellets of the desired size, with a solution, preferably an aqueous solution, of a compound of the metal which it is desired to combine with the activated alumina, and then drying at the desired temperature. A convenient procedure comprises heating the activated alumina under a reduced pressure to a temperature of about 300° C. to remove air from the pores thereof, and cooling the material and adding the impregnating solution under reduced pressure. If desired, impregnation of the activated alumina may be accomplished by covering it with the impregnating solution and alternately boiling and cooling, or the mixture may simply be allowed to stand for a sufficient period of time. The concentration of the impregnating solution used in each particular case will depend upon the solubility of the particular metal compound at the temperature of the impregnation and upon the desired concentration of the active metal or metal compound in the compound catalyst. The procedure to be followed in drying or treating the impregnated material will vary depending upon the chemical constitution of the compound catalyst. In general, the material may be dried in air at temperatures as high as 800° C., and even higher in some cases. In other cases it may be desirable to effect the drying with inert gases such as nitrogen, or reducing gases such as hydrogen, paraffin hydrocarbons, etc.

Many of the metal compounds which are desired as catalytically active constituents of the compound catalysts, such as the oxides and sulphides are not sufficiently water soluble to permit direct impregnation of the activated alumina with aqueous solutions of them. In such cases, the activated alumina may be impregnated with an aqueous solution of a salt which can be converted to the desired metal oxide or metal sulphide by calcination or hydrogen sulphide treatment, respectively, of the impregnated material. The desired active metal oxide-containing catalysts may also be obtained by precipitating the corresponding metal hydroxide on the surface of the activated alumina and subjecting the thus obtained material to calcination under suitable temperature conditions. Other suitable modes of preparing the compound catalysts will be apparent to those skilled in the art. Conditions of preparation should be such that the essential physical structure and surface characteristics possessed by the activated alumina are not materially altered.

The invention is not restricted to the use of compound catalysts containing any specific amount of the active metal or active metal compound. The optimum concentration of said active material in the compound catalyst will generally depend upon the particular organic compound or material to be dehydrogenated and upon the conditions of temperature, space velocity, etc., under which the dehydrogenation is to be effected. We preferably employ compound catalysts wherein the activated alumina is in gravimetric excess of the active metal or metal compound. Good results have been obtained by employing compound catalysts containing from about 0.5% to about 40% by weight of the active metal or active metal compound. Higher or lower concentrations may be used when necessary or desirable. A preferred concentration range is from about 0.5% to about 10% by weight of the catalyst mass. In the case of the compound catalysts comprising a chromium compound as the active agent, good results were obtained with catalysts containing up to about 10% by weight of the catalyst mass.

It is known that many compound catalysts have, in a particular process, a variable catalytic activity depending upon the concentration of one of the active constituents in the catalyst, and, that if, other conditions being the same, catalyst activity is plotted against concentration of said active constituent, the resulting curve will show a definite maximum. We have observed that some of the catalysts used in the execution of our invention also have, under a given set of conditions, maximum activity when the active catalytic material is present in the catalyst in a specific critical amount. Although we may, and in many cases do, employ catalysts wherein the constituents are present in such amount that the catalyst has maximum activity, this is not at all necessary. In many cases, it is from practical or economical considerations more advantageous to employ catalysts containing more or less than the optimum concentration of the active constituent or constituents.

The solid compound catalyst is employed in manners customary in catalytic processes of this type. In general, the desired quantity of the catalytic material in the form of particles or granules of the desired size is packed into a reaction tube or reaction chamber of any suitable material and capacity. The catalytic material is maintained at the desired temperature, preferably by suitable external heating means, while the material to be dehydrogenated, in either the liquid or vapor phase but preferably in the vapor phase, is passed into contact with it at the desired space velocity and under the desired pressure of operation.

The term "space velocity" as used herein may be defined as the number of units of volume of gaseous material, measured at 0° C. and a pressure of 76 cm. of mercury, contacted with a unit volume of catalyst per hour.

The space velocity to be employed in any particular case depends upon the activity of the particular catalyst, the compound or mixture of compounds to be dehydrogenated, and upon other conditions of operation, particularly the temperature, as well as upon the production rate desired. For each material treated and each selected catalyst, the space velocity and temperature can be so regulated that we may obtain practical conversions at a practical rate while substantially obviating the occurrence of cracking and other undesirable side reactions. Space velocities of from about 100 to about 10,000 have been employed advantageously. Preferably employed space velocities are in the range of from about 150 to about 3000 at temperatures of from about 500° C. to about 700° C.

The process is preferably executed at temperatures of from about 350° C. to about 850° C., although, in some cases, higher or lower temperatures may be used advantageously. At lower temperatures the compound catalysts are generally less active and prohibitively low space velocities may be required to attain practicable conversions. At temperatures much greater than 850° C., excessive cracking occurs, and, in addition, there may be substantial loss of activity due to breakdown of the structure of the catalyst. Although the catalysts may in some cases be more active at the higher temperatures, the rate of loss of activity may also be higher making it more economical to operate at lower temperatures at contact times favoring equilibrium conditions. Excellent results have been obtained by employing temperatures of from about 400° C. to 700° C.

The process of the invention may be executed at any suitable pressure. While pressures of about atmospheric are generally preferred, subatmospheric and superatmospheric pressures may be advantageously employed. In some cases, pressures of 3 to 7 atmospheres and even higher may be used. When it is desired to increase the conversion by lowering the partial pressure of the material to be dehydrogenated in the reaction mixture, reaction may be effected under subatmospheric pressure.

Other means may be resorted to for decreasing the partial pressure of the material to be dehydrogenated in the reaction mixture. For example, the material to be dehydrogenated may be passed into contact with the catalyst in admixture with a material which is relatively inert under the conditions of the dehydrogenation and which preferably exists in the gaseous state under such conditions. Materials suitable for this purpose may be sufficiently stable cyclic or aliphatic hydrocarbons, hydrogen, nitrogen, carbon dioxide, etc. The added material may act as an inert diluent and, in addition, act to decrease the partial pressure of the treated material in the reaction mixture.

Another convenient mode of operating so as to decrease the partial pressure of the material to be treated in the reaction zone comprises effecting the dehydrogenation reaction in the presence of a suitable hydrogen acceptor. The desired dehydrogenation may be effected in the presence of an unsaturated compound which when hydrogenated is less readily dehydrogenated than the material treated. For example, when a compound containing more than two carbon atoms is to be dehydrogenated, sufficient ethylene may be mixed therewith and the process executed under such conditions that the hydrogen liberated by occurrence of the desired dehydrogenation hydrogenates at least a part of the ethylene to ethane whereby free hydrogen is removed from the sphere of reaction. When operating in this manner, the hydrogen acceptor is chosen with respect to the hydrogen donator and the process executed under such conditions that the acceptor is more easily hydrogenated than the dehydrogenation product of the donator and the hydrogenated acceptor is less readily dehydrogenated than is the donator.

The selective catalytic dehydrogenation action of the compound catalysts used in the execution of the invention and their stability under the conditions of their practicable use, permits their continued employment over long periods of time without substantial decrease in their activity. During continued use over long periods, the catalysts may gradually lose activity. In the absence of specific catalyst poisons, loss of activity of the catalyst is probably due to deposition of carbon on the surface thereof. It has been found that the original activity can usually be restored substantially completely by oxidizing the deposited carbon and thereby effecting its removal.

The reactivation of the catalyst is preferably effected without removing the catalyst from the reaction tube or chamber. The reactivation is readily accomplished by passing air or some other gaseous material containing free oxygen into contact with the catalyst maintained at about the temperature at which it was used in the execution of the dehydrogenation reaction. If desired the reactivation may be effected in the presence of an added inert gaseous material as steam, carbon dioxide, nitrogen, etc. For example, a mixture of air and steam is in some cases suitable. In other cases, steam or carbon dioxide, alone or in admixture, are suitable reactivating agents. During the reactivation, the temperature of the catalyst mass is preferably maintained at from about 350° C. to about 850° C. When air is used as the oxidizing agent, it may be passed through the catalyst mass at an appropriate rate, usually at a space velocity of from about 150 to about 1600. Temperatures greater than about 850° C. are usually to be avoided since they may cause undesired changes in the physical structure of the catalyst and permanently affect its activity. After combustion has started, the temperature of the catalyst mass can be controlled, at least in part, by regulating the flow of air. The time of treatment necessary to restore the catalyst activity will depend upon various factors such as the conditions of the reactivation treatment and the amount of carbon to be oxidized. The reactivation, in many cases, can be effected in one or two hours. The utilization period of the catalysts may vary; in practice, the catalysts have been used successfully for several days between reactivation treatments. In some cases, as when activated alumina-chromium oxide catalysts are reactivated, it may be desirable to follow the oxidation treatment by treatment with a reducing gas such as hydrogen. The oxidation treatment of such a catalyst may result in oxidation of chromic oxide ($Cr_2O_3$) to chromium trioxide ($CrO_3$), which, although unstable at high temperatures, is stabilized by reaction with the alumina to form aluminum chromate. The reduction treatment regenerates the chromic oxide. Prior to their reuse, the reactivated catalysts may be treated with the required amount of an activating agent such as water vapor, hydrogen sulphide, hydrogen selenide, hydrogen telluride, and the like or mixtures of the same.

Our process is applicable to the dehydrogenation of organic compounds to compounds containing the same number of carbon atoms' but fewer hydrogen atoms. It is particularly applicable to the technical scale conversion of saturated hydrocarbons to the corresponding unsaturated compounds possessing one or a plurality of double bonds, and to the conversion of unsaturated hydrocarbons to still more unsaturated products. The paraffin hydrocarbons such as ethane, propane, normal butane, isobutane, the pentanes, the hexanes, the heptanes and the like may be dehydrogenated to the corresponding olefines. In some cases, the olefine may be dehydrogenated to the corresponding diolefine or other polyolefine. The cycloaliphatic hydrocarbons may be dehydrogenated to the corresponding unsaturated compounds. For example, cyclohexane may be converted to cyclohexene which in turn may be converted to benzene. A straight or branched chain hydrocarbon may be linked to a cyclic radical as of the aromatic, alicyclic or heterocyclic types. The dehydrogenation of compounds such as ethyl benzene, propyl benzene, ethyl naphthylene, etc., is contemplated. In some cases the higher paraffins may be dehydrogenated and converted to aromatic compounds containing the same number of carbon atoms.

The invention may be applied to the treatment of hydrocarbon mixtures of saturated and unsaturated hydrocarbons such as occur in natural gas, cracked petroleum and petroleum products, mixtures resulting from the pyrogenetic treatment of shale oil, peat, asphalt, coal, animal and vegetable oils, etc. Technical olefine-paraffin mixtures such as the propane-propene, butane-butene, pentane-pentene fractions, etc., may be treated as such and the ratio of olefine to paraffin increased, or the fraction or original mixture from which it is derived may be treated by any suitable means and the olefines removed therefrom prior to treatment of the paraffins. Motor fuel mixtures, such as gasoline, which contain small amounts of unsaturates may be treated in accordance with the process of the invention and the ratio of unsaturates to saturates increased and the anti-knock qualities of the fuel enhanced.

The following examples are to illustrate the invention. The invention is not to be regarded as restricted to the specific catalysts, materials treated, conditions and modes of execution illustrated in the examples.

*Example I*

About 90 c. c. of the catalyst in the form of granules of from about 8 to 14 mesh were packed into a quartz or $KA_2$ steel reaction tube having an inside diameter of about 1.6 cm. and a heating length of about 65 cms. The catalyst was raised to and maintained at the desired reaction temperature by external heating of the reaction tube while gaseous isobutane was passed through the catalyst tube under about atmospheric pressure and at the desired space velocity. The expansion caused by the occurrence of the dehydrogenation reaction was measured and the effluent gas mixture analyzed to determine the per cent by weight conversion of the isobutane to isobutylene on one passage through the packed catalyst tube.

The results obtained with a wide variety of compound catalysts employed at different conditions of temperature and space velocity are tabulated in Table I.

Table I shows the efficacy of a variety of compound activated alumina-containing catalysts when employed at temperatures of from 400° C. to 600° C. to effect the dehydrogenation of isobutane which is passed into contact with them at space velocities of from about 198 to 1500. By means of comparative experimental data, the superiority of the compound catalysts over an activated alumina per se are strikingly shown. It is seen that, in addition to giving a better conversion, the compound catalysts are more selective and result in less cracking.

Table I

| Temp., °C. | Space velocity | Compound catalyst | | | Maximum conversion to isobutylene, percent | Ratio isobutylene to total olefines |
|---|---|---|---|---|---|---|
| | | Active compound | Percent active element | Prepared by impregnating an activated alumina with— | | |
| 400 | 198 | $CrO_3$ | 15.2 Cr | Conc. soln. of $CrO_3$ | 5.0 | 0.85 |
| 450 | 198 | do | 15.2 Cr | do | 15.4 | 0.87 |
| 500 | 198 | Activated alumina alone | | | 0.0 | |
| 500 | 198 | $CrO_3$ | 0.15 Cr | 0.04M soln. of $CrO_3$ | 1.0 | 0.83 |
| 500 | 198 | do | 0.57 Cr | 0.15M soln. of $CrO_3$ | 3.8 | 0.83 |
| 500 | 198 | do | 1.18 Cr | 1.20M soln. of $CrO_3$ | 21.3 | 0.88 |
| 500 | 198 | do | 1.96 Cr | 0.64M soln. of $CrO_3$ | 26.3 | 0.90 |
| 500 | 198 | do | 3.72 Cr | 1.50M soln. of $CrO_3$ | 29.0 | 0.90 |
| 500 | 198 | $Cr_2O_3$ | 0.67 Cr | 0.50M soln. of $Cr(NO_3)_3$ | 20.8 | 0.86 |
| 500 | 198 | $CrCl_3$ | 1.40 Cr | 1.00M soln. of $CrCl_3$ | 11.8 | 0.85 |
| 500 | 198 | $CrO_3$ + $Fe_2O_3$ | 1.79 Cr / 1.46 Fe | 0.64M soln. of $CrO_3$ / 0.70M soln. of $Fe(NO_3)_3$ | 13.0 | 0.85 |
| 500 | 198 | Ni | 0.5 Ni | $Ni(NO_3)_2$+$NH_4OH$** | 14.9 | 0.90 |
| 550 | 198 | Activated alumina alone | | | 5.4 | 0.77 |
| 550 | 198 | $CrO_3$ | 0.15 Cr | 0.06M soln. of $CrO_3$ | 29.4 | 0.84 |
| 550 | 198 | do | 0.57 Cr | 0.64M soln. of $CrO_3$ | 34.1 | 0.83 |
| 550 | 198 | do | 1.18 Cr | 1.20M soln. of $CrO_3$ | 35.0 | 0.82 |
| 550 | 198 | do | 1.96 Cr | 0.64M soln. of $CrO_3$ | 37.5 | 0.86 |
| 550 | 198 | do | 3.72 Cr | 1.50M soln. of $CrO_3$ | 34.4 | 0.88 |
| 550 | 198 | do | 0.67 Cr | 0.50M soln. of $Cr(NO_3)_3$ | 30.7 | 0.85 |
| 550 | 198 | $Na_2Cr_2O_7$ | 1.60 Cr | 0.50M soln. of $Na_2Cr_2O_7$ | 44.2 | 0.89 |
| 550 | 198 | do | 2.55 Cr | do | 45.7 | 0.88 |
| 550 | 198 | do | 2.76 Cr | do | 44.9 | 0.91 |
| 550 | 198 | $K_2CrO_4$ | 1.82 Cr | 1.00M soln. of $K_2CrO_4$ | 30.6 | 0.90 |
| 550 | 198 | $K_2Cr_2O_7$ | 2.9 Cr | 0.50M soln. of $K_2Cr_2O_7$ | 41.7 | 0.91 |
| 550 | 198 | $CrCl_3$ | 1.4 Cr | 1.00M soln. of $CrCl_3$ | 32.6 | 0.79 |
| 550 | 198 | $Cr_2(SO_4)_3$ | 2.5 Cr | 0.50M soln. of $Cr_2(SO_4)_3$ | 37.7 | 0.85 |
| 550 | 198 | $CrO_3$ + $Fe_2O_3$ | 1.97 Cr / 1.46 Fe | 0.64M soln. of $CrO_3$ / 0.70M soln. of $Fe(NO_3)_3$ | 37.1 | 0.88 |
| 550 | 198 | $CrO_3$ + $Fe_2O_3$ | 1.56 Cr / 2.86 Fe | 0.64M soln. of $CrO_3$ / 0.70M soln. of $Fe(NO_3)_3$ | 39.7 | 0.93 |
| 550 | 198 | $Na_2Cr_2O_7$ + $Fe_2O_3$ | 2.41 Cr / 5.7 Fe | 0.50M soln. of $Na_2Cr_2O_7$ / (*) | 43.6 | 0.93 |
| 550 | 198 | $Fe_2O_3$ | 5.7 Fe | (*) | 36.9 | 0.93 |
| 550 | 198 | do | 5.7 Fe | (*) | 16.4 | 0.81 |
| 550 | 198 | $Co_2O_3$ | 2.4 Co | 1.00M soln. of $Co(NO_3)_2$ | 8.3 | 0.79 |
| 550 | 198 | $NaMnO_4$ | 1.4 Mn | 1.00M soln. of $NaMnO_4$ | 37.7 | 0.89 |
| 550 | 198 | $Na_2MoO_4$ | 1.9 Mo | 0.50M soln. of $Na_2MoO_4$ | 33.0 | 0.81 |
| 550 | 198 | $(VO)_2(SO_4)_3$ | 1.5 V | 0.50M soln. of $(VO)_2(SO_4)_3$ | 24.8 | 0.76 |
| 550 | 198 | $UO_2$ | 4.1 U | 0.20M soln. of $UO_2(NO_3)_2$ | 10.2 | 0.79 |
| 550 | 198 | $CeO_2$ | 2.8 Ce | 0.33M soln. of $Ce(NO_3)_3$ | 32.0 | 0.81 |
| 550 | 198 | Ti-K oxide | 2.7 Ti | 1.00M soln. TiK$(COOH)_2$ | | |
| 550 | 198 | Activated alumina alone | | | 5.4 | 0.77 |
| 550 | 396 | $Na_2Cr_2O_7$ | 1.6 Cr | 0.50M soln. $Na_2Cr_2O_7$ | 31.9 | 0.89 |
| 550 | 396 | do | 5.9 Cr | 1.50M soln. $Na_2Cr_2O_7$ | 45.4 | 0.92 |
| 550 | 750 | $CrO_3$ | 11.1 Cr | Conc. soln. $CrO_3$ | 33.6 | |
| 550 | 1,500 | do | 18.2 Cr | do | 29.0 | |
| 575 | 198 | Activated alumina alone | | | 13.1 | 0.75 |
| 575 | 198 | $Fe_2O_3$ | 5.7 Fe | (*) | 45.0 | 0.87 |
| 600 | 198 | None | None | None | 36.2 | 0.75 |
| 600 | 198 | $CrO_3$ | 1.98 Cr | 0.64M soln. of $CrO_3$ | 48.9 | 0.82 |
| 600 | 198 | $K_2CrO_4$ | 1.82 Cr | 1.00M soln. of $K_2CrO_4$ | 56.7 | 0.84 |
| 600 | 198 | $K_2Cr_2O_7$ | 2.65 Cr | 0.50M soln. of $K_2Cr_2O_7$ | 57.5 | 0.87 |
| 600 | 198 | $Na_2Cr_2O_7$ | 2.76 Cr | 0.50M soln. of $Na_2Cr_2O_7$ | 53.4 | 0.87 |
| 600 | 198 | $Fe_2O_3$ | 5.7 Fe | (*) | 59.4 | 0.83 |
| 600 | 198 | $Fe_2O_3$ + $Na_2Cr_2O_7$ | 5.7 Fe / 2.4 Cr | (*) / 0.50M soln. of $Na_2Cr_2O_7$ | 60.6 | 0.88 |
| 600 | 198 | $Fe_2O_3$ + $CrO_3$ | 5.7 Fe / 1.5 Cr | (*) / 0.64M soln. of $CrO_3$ | 55.3 | 0.90 |
| 600 | 398 | Activated alumina alone | | | 24.1 | 0.75 |
| 600 | 396 | $Na_2Cr_2O_7$ | 1.6 Cr | 0.50M soln. of $Na_2Cr_2O_7$ | 54.2 | 0.95 |
| 600 | 398 | do | 5.9 Cr | 1.50M soln. of $Na_2Cr_2O_7$ | 54.0 | 0.80 |
| 600 | 666 | do | 1.6 Cr | 0.50M soln. of $Na_2Cr_2O_7$ | 32.7 | 0.82 |

** Treated with $H_2S$ prior to use.
* Prepared by impregnating an activated alumina with an aqueous solution of ferrous chloride, treating the thus impregnated material with an aqueous solution of NaOH and/or $Na_2CO_3$, and then drying at about 120° C.

Example II

The data of the following Table II illustrate the superiority of the compound catalyst used in the execution of the process of this invention over representative known catalysts employed per se or mounted on conventional carriers. The dehydrogenations were effected, in substantially the manner described in Example I, by passing isobutane at a space velocity of about 198 over the solid catalyst maintained at the temperature shown in the table.

pared by heating 8 to 14 mesh particles of an activated alumina under reduced pressure at a Table II

| Temp. °C. | Space velocity | Catalyst | Maximum conversion to isobutylene percent | Ratio isobutylene to total olefines |
|---|---|---|---|---|
| 550 | 198 | Compound catalyst: $(VO)_2(SO_4)_3$-activated alumina | 33.0 | 0.91 |
| 600 | 198 | $(VO)_2(SO_4)_3$ on silica gel | 9.2 | 0.51 |
| 600 | 198 | $(VO)_2(SO_4)_3$ on pumice | 7.2 | |
| 650 | 198 | Granular $(VO)_2(SO_4)_3$-no carrier | 16.7 | 0.52 |
| 600 | 198 | Compound catalyst: ZnO-activated alumina | 35.2 | 0.75 |
| 550 | 198 | ZnO on silica gel | 19.5 | 0.77 |
| 550 | 198 | ZnO on pumice | 17.9 | 0.70 |
| 550 | 198 | Compound catalyst: $Na_2Cr_2O_7$-activated alumina | 44.9 | 0.92 |
| 550 | 198 | $Na_2Cr_2O_7$ on Majolica chips | 4.3 | 0.81 |
| 550 | 198 | $Na_2Cr_2O_7$ on pumice | 4.0 | 0.93 |
| 600 | 198 | Compound catalyst: $Fe_2O_3$-activated alumina | 59.4 | 0.83 |
| 500 | 198 | $Fe_2O_3$ on pumice | 4.2 | 0.52 |
| 600 | 198 | $Fe_2O_3$ gel-no carrier | Decomposed to C and $H_2$ | |
| 500 | 198 | Compound catalyst: Ni-activated alumina * | 14.9 | 0.90 |
| 450 | 198 | Ni on pumice | Decomposed to C and $H_2$ | |

* Treated with $H_2S$ prior to use.

Example III

A compound chromium oxide-activated alumina catalyst containing about 6% by weight of chromium oxide ($Cr_2O_3$) was prepared by impregnating granules of an activated alumina with an aqueous chromic acid solution and subsequently drying the resulting material. About 35 c. c. of the catalyst were packed in a quartz reaction tube having an inside diameter of 1.04 cm. and a heating length of 65 cms.

The catalyst was maintained at a temperature of about 575° C. while gaseous normal butane was passed through it at a space velocity of about 750. The maximum conversion of the butane to butylene per single pass through the reaction tube was about 33.3%.

Example IV

A compound chromium oxide-activated alumina catalyst containing about 20% by weight of chromium oxide ($Cr_2O_3$) was prepared by impregnating granules (8 to 14 mesh) of an activated alumina with an aqueous solution of chromic acid. The dried catalytic material was packed in a quartz reaction tube having an inside diameter of 1.04 cm. and a heating length of about 65 cms. The reaction tube was externally heated to a temperature of about 575° C. while propane was passed through it to reduce the $CrO_3$ to $Cr_2O_3$.

The catalyst mass was maintained at a temperature of about 585° C. while propane was passed through it at a space velocity of from about 1200 to 1500 for a period of about 2 hours. During this period of time, the average conversion of propane to propylene per pass was about 30%. Over a 4 hour period, the average conversion was about 26.3%.

After being in uninterrupted service for 4 hours, the catalyst was regenerated by passing air through the catalyst tube at a space velocity of from about 600 to 720 and a temperature of about 580° C. The regeneration required about 1 hour. The initial activity of the catalyst was substantially restored.

Example V

Compound chromium oxide-activated alumina catalyst containing about 17% $Cr_2O_3$ was prepared by heating 8 to 14 mesh particles of an activated alumina under reduced pressure at a temperature of about 300° C. for about 1 hour. At the end of this time, the activated alumina was allowed to cool and, while it was still under reduced pressure, impregnated with an aqueous chromic acid solution. The dried catalyst was packed in a quartz reaction tube.

Gaseous isobutane was passed, at a space velocity of about 756, into contact with the catalyst maintained at a temperature of about 550° C. The average conversion of the isobutane to isobutylene per pass was about 34% over a period of 2 hours. At the end of this time the catalyst was regenerated by treatment with air at a temperature of about 550° C. for about 1 hour. Approximately the same conversion was obtained with the regenerated catalyst.

Example VI

A quartz reaction tube was packed with a compound chromium oxide-activated alumina catalyst which had a chromium oxide ($Cr_2O_3$) content of from about 17% to 20%. The catalyst was heated to a temperature of about 600° C. while gaseous cyclohexane was passed into contact with it at an average space velocity of about 510. The dehydrogenation product, benzene, was obtained in good yield.

In like manner, methyl cyclohexane may be dehydrogenated to toluene.

Example VII

Ethyl benzene vapor was passed, at a space velocity of about 450, into contact with the catalyst described in Example VI, the catalyst being maintained at a temperature of about 630° C. About 84 gm. of ethyl benzene were passed through the reaction tube. The conversion to styrene per pass was about 25%.

Example VIII

A sodium dichromate-activated alumina catalyst was prepared by impregnating granules (8 to 14 mesh) of an activated alumina with an aqueous solution (about 0.50M) of $Na_2Cr_2O_3$. The dried catalyst, which contained about 1.8% Cr by weight, was packed in a $KA_2$ steel reaction tube. The catalyst mass was heated to a temperature of about 625° C. while propane gas was passed through the tube at a space velocity of about 2100. The conversion to propylene per pass was about 36.1%. At a temperature of about 650° C. and a space velocity of about 4560, the conversion to propylene per pass was about 33.5%.

Example IX

The following table shows the results of runs made by passing liquid normal heptane into contact with $Na_2Cr_2O_7$-activated alumina and $Fe_2O_3$-activated alumina catalysts under various conditions of temperature and feed rate of the liquid heptane. The $Na_2Cr_2O_7$-activated alumina catalysts were prepared by impregnating granules of an activated alumina with an aqueous solution of $Na_2Cr_2O_7$. The dried catalyst mass contained about 1.52% Cr. The $Fe_2O_3$-activated alumina catalyst was prepared by impregnating the granules of the activated alumina with an aqueous ferrous chloride solution, treating the impregnated material with an aqueous solution of sodium hydroxide and sodium carbonate, washing the thus-treated material with water, and then drying it in air at a temperature of about 120° C.

The table shows the average conversions over a 6-hour period. The aromatics consisted of about 80% toluene and about 20% benzene. The aliphatic unsaturate fraction contained a considerable amount of heptene.

| Catalyst | Feed rate temp. liquid heptane | | Catalyst volume c. c. | Average conversion—6 hours | |
|---|---|---|---|---|---|
| | °C. | C. c. min. | | Percent aromatics | Percent aliphatic unsaturate |
| $Na_2Cr_2O_7$-act. alumina | 575 | 0.50 | 90 | 26.2 | 10.8 |
| Do | 600 | 0.75 | 90 | 9.6 | 16.2 |
| $Fe_2O_3$-act. alumina | 580 | 0.75 | 90 | 2.3 | 13.1 |
| Do | 600 | 0.55 | 90 | 2.4 | 10.4 |

The process of the invention may be executed in a continuous manner in any suitable apparatus. If the treated material is not completely dehydrogenated on one passage through the reaction vessel, the effluent material may be recycled through the reaction vessel until the desired conversion is attained. When recirculating means are employed, the conversion per pass may be increased by intermittently or continuously withdrawing one or more of the products of the dehydrogenation from the system. For example, one or a plurality of the conversion stages may be in communication with one or more stages wherein the material leaving a conversion stage or stages is treated for recovery of the unsaturates and/or hydrogen, the unreacted material being recycled to a conversion stage. In the dehydrogenation of paraffin hydrocarbons to olefines, the effluent gases can be treated to remove olefines therefrom by contacting them with an aqueous polybasic mineral acid solution whereby the olefines are absorbed. The paraffins thus denuded of olefines may again be passed into contact with the dehydrogenation catalyst. Alternatively, the exit gases may be brought into contact with a hydrogen removing or binding agent.

For continuous operation, we may employ a plurality of independently controlled dehydrogenation units in communication in such a manner that one or more units is always in service for the dehydrogenation while the catalyst is being regenerated in situ in one or more other units.

While we have described our invention in a detailed manner and illustrated suitable modes for execution of the same, it is to be understood that modifications may be made and that no limitations other than those imposed by the scope of the appended claims are intended.

This application is a continuation-in-part of our copending application, Serial No. 18,386, filed April 26, 1935.

We claim as our invention:

1. A process for the catalytic dehydrogenation of a butane to a butylene which comprises passing the vapors of a butane into contact with a solid catalyst essentially comprising an activated alumina having the characteristics of the "activated alumina" of commerce and a substantial but lesser amount of at least one compound selected from the group consisting of the oxides and sulphides of iron incorporated in the surface of the activated alumina, the catalyst being maintained at a temperature of from about 350° C. to about 850° C.

2. A process for the catalytic dehydrogenation of a butane to a butylene which comprises passing the vapors of a butane into contact with a solid contact catalyst essentially comprising an activated alumina having the characteristics of the "activated alumina" of commerce and from about 0.5% to about 10% of the catalyst mass of a chromium compound incorporated in the surface of the activated alumina, the catalyst being maintained at a temperature of from about 350° C. to about 850° C.

3. A process for the catalytic dehydrogenation of an aliphatic hydrocarbon which comprises contacting an aliphatic hydrocarbon containing at least two carbon atoms with a solid catalyst essentially comprising an activated alumina having the characteristics of the "activated alumina" of commerce and a lesser but substantial amount of at least one catalytically active material selected from the group consisting of the metals and compounds of the metals of the first transition series of the periodic table incorporated in the surface of the activated alumina, the catalyst being maintained at a temperature of from about 350° C. to about 850° C.

4. A process for the catalytic dehydrogenation of a paraffin hydrocarbon to the corresponding olefine which comprises contacting a paraffin hydrocarbon containing at least two carbon atoms with a solid compound catalyst essentially consisting of an activated alumina having the characteristics of the "activated alumina" of commerce and a substantial but lesser amount of a chromium compound incorporated in the surface of the activated alumina, the catalyst being maintained at a temperature of from about 350° C. to about 850° C.

5. A process for the catalytic dehydrogenation of a hydrocarbon which comprises contacting a dehydrogenatable hydrocarbon containing at least two carbon atoms with a solid compound catalyst essentially consisting of an activated alumina having the characteristics of the "activated alumina" of commerce and a lesser but substantial amount of at least one catalytically active material selected from the group consisting of the metals and compounds of the metals of the first transition series of the periodic table incorporated in the surface of the activated alumina, the catalyst being maintained at from about 350° C. to about 850° C.

6. A process for the catalytic dehydrogenation of a hydrocarbon which comprises contacting a dehydrogenatable hydrocarbon containing at least two carbon atoms with a solid compound catalyst essentially comprising an activated alumina having the characteristics of the "activated alumina" of commerce and a lesser but substantial amount of at least one catalytically active compound of a metal of the transition series of the periodic table incorporated in the surface of the activated alumina, the catalyst being maintained at a temperature of from about 350° C. to 850° C.

7. In a process for effecting the catalytic dehydrogenation of a dehydrogenatable hydrocarbon to a product containing the same number of carbon atoms but fewer hydrogen atoms by contacting such a hydrocarbon with a catalytically active material at an elevated temperature favorable to dehydrogenation but below the temperature at which substantial cracking occurs, the step which comprises employing the catalytically active material incorporated in the surface of an activated alumina having the characteristics of the "activated alumina" of commerce.

8. A process for the catalytic dehydrogenation of a hydrocarbon which comprises contacting a dehydrogenatable hydrocarbon containing at least two carbon atoms with a solid catalyst essentially comprising an activated alumina having the characteristics of the "activated alumina" of commerce and a lesser but substantial amount of a catalytically active material selected from the group consisting of the metals and compounds of the metals of the transition series of the periodic table incorporated in the surface of the activated alumina, the process being executed at an elevated temperature favorable to dehydrogenation but below the temperature at which substantial cracking occurs.

9. A process for the catalytic dehydrogenation of a hydrocarbon which comprises contacting a dehydrogenatable hydrocarbon containing at least two carbon atoms with a solid catalyst essentially comprising an activated alumina having the characteristics of the "activated alumina" of commerce and a lesser but substantial amount of a catalytically active material selected from the group consisting of the metals and compounds of the metals of the transition series of the periodic table incorporated in the surface of the activated alumina, the dehydrogenation being effected in the initial presence of a substantial amount of added hydrogen and at an elevated temperature favorable to dehydrogenation but below the temperature at which substantial cracking occurs.

HERBERT P. A. GROLL.
JAMES BURGIN.

DISCLAIMER 2,184,235.—*Herbert P. A. Groll*, Berkeley, and *James Burgin*, Oakland, Calif. CATALYTIC DEHYDROGENATION OF ORGANIC COMPOUNDS. Patent dated December 19, 1939. Disclaimer filed December 30, 1943, by the assignee, *Shell Development Company*.

Hereby disclaims the following—

Page 3, right hand column, line 29, the passage "and 2,015,593 each", and the word "different".

[*Official Gazette February 1, 1944.*]